Jan. 14, 1958 A. C. SAMPIETRO 2,819,881
HEAT EXCHANGER
Filed April 19, 1955 2 Sheets-Sheet 1

Inventor
Achilles C. Sampietro

Jan. 14, 1958  A. C. SAMPIETRO  2,819,881
HEAT EXCHANGER
Filed April 19, 1955  2 Sheets-Sheet 2
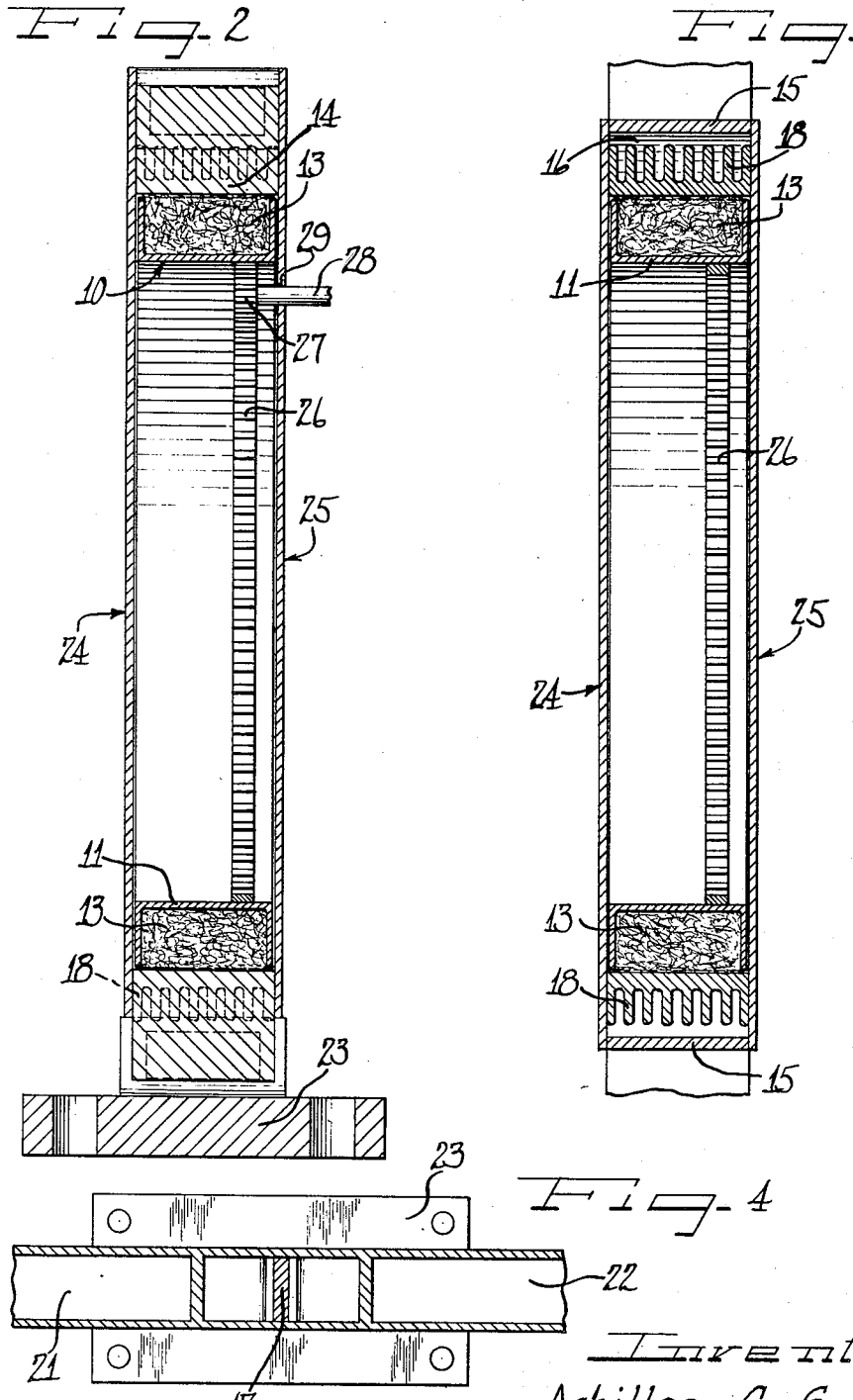

United States Patent Office 2,819,881
Patented Jan. 14, 1958

2,819,881

HEAT EXCHANGER

Achilles C. Sampietro, Ann Arbor, Mich., assignor to Thompson Products, Inc., Cleveland, Ohio, a corporation of Ohio Application April 19, 1955, Serial No. 502,406

2 Claims. (Cl. 257—6)

This invention relates to a heat exchanger as well as to a method of heat transfer between two relatively movable members.

In the transfer of heat from one fluid or gas to another such as in gas turbines heavy and cumbersome equipment has heretofore been required. Difficulty has also been encountered in providing a unit that would have good longevity despite the high temperatures that are involved.

If a suitable liquid, which would be capable of transferring heat at high temperatures, were available the problem would be easier to solve. In the present invention, however, the instant problem has been solved by the use of a flowable particulated material which might be termed a "solid liquid."

Actually, it is an object of this invention to provide an improved heat exchanger making use of a heat transfer medium in the form of flowable particles of solid material.

Another object of the invention is to provide an improved heat exchanger adapted for use under high temperature requirements.

Still another object of the invention is to provide a novel method of heat exchange and one which particularly lends itself for use in gas turbines and other applications where high temperatures are encountered.

In accordance with the general features of this invention, there is provided a heat exchanger including relatively rotatable members in nested relationship one within the other, one of the members having a cylindrical surface in heat transfer contact with the other member and which surface is composed of confined and compacted particles of solid flowable material for scrubbing the surface of the other member in the relative rotation of the members to effect a heat transfer between the members.

Another feature of the invention relates to the provision of a heat exchanger including two relatively rotatable cylindrical members nested one with the other and one of which as an annular concentric chamber divided by transverse partitions into at least two segments, a cylindrical wall of the one chamber being in frictional contact with cylindrical wall of the other member, the wall of the other member comprising particles of flowable materials frictionally bearing against the wall of the one member in heat transfer arrangement therewith, and means for delivering streams of fluid through the chamber segments one of which imparts heat to the flowable materials and the other of which picks up heat therefrom in the relative rotation of the members.

Still other features of the invention relate to the provision in a method of heat transfer between two relatively movable members in frictional heat transfer contact with each other, the steps of scrubbing the surface of one member by a confined flowable mass of material particles comprising a surface of the other member and contemporaneously flowing fluid streams in opposite directions through the one member, one of which streams is heated for imparting heat to the mass through the frictional contact and the other of which is heated by heat transferred thereto from the mass.

Other objects and features of this invention will more readily appear from the following detailed description taken in conjunction with the accompanying drawings which illustrate a single embodiment thereof, and in which:

Figure 2 is a fragmentary vertical sectional view particularly in elevation taken on the line II—II of Fig. 1 looking in the direction indicated by the arrows;

Figure 3 is a fragmentary sectional view similar to Fig. 2 but taken on the line III—III of Fig. 1 looking downwardly; and Figure 4 is a fragmentary sectional view taken on the line IV—IV of Fig. 1 looking downwardly.

As shown on the drawings:

Figure 1:
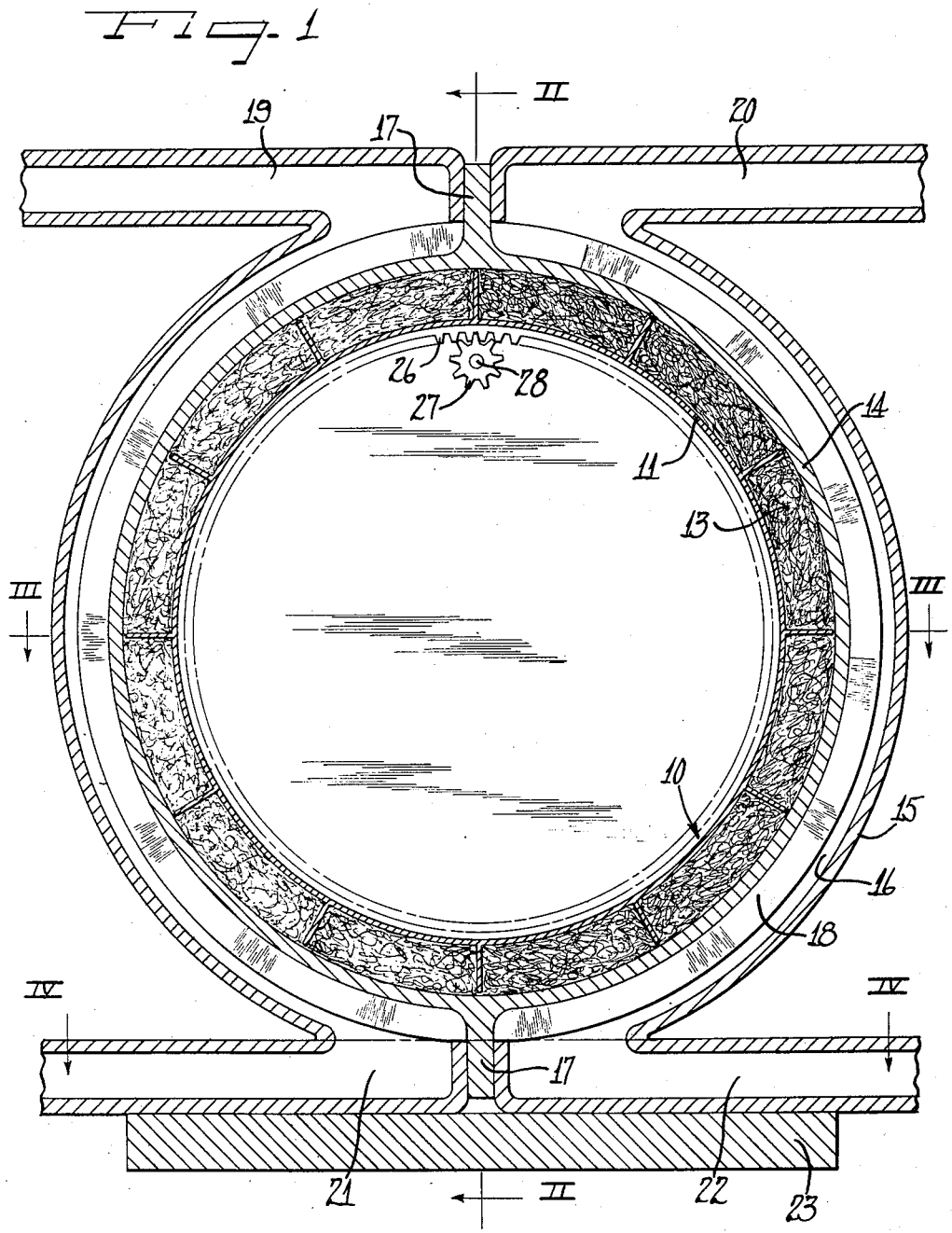
Figure 1 is a fragmentary side view of a heat exchanger with a side plate removed to show the interior of the device and with parts in section.

The reference character 10 designates generally a cylindrical drum which may be made of any heat resistant material such as cast iron and has mounted on its periphery a plurality of segmental or arcuate boxes 11 collectively arranged in a common annulus about the periphery of the drum 10 and suitably secured thereto. These boxes may comprise a series of several sections or may comprise one annular section with a series of longitudinal partitions for forming confined areas about the periphery of the drum 10. The boxes like the drum 10 may be made of any suitable heat resistant material and each opens radially outwardly.

The boxes are filled with a flowable mass of material 13 such for example as a mixture of carbon and metal particles. Any mixture of particles of suitable materials that would flow in a manner similar to liquid could be employed. For illustration excellent results may be obtained by a mixture of graphite powder and steel or sintered shots.

The material 13 is compacted in and fills the boxes in such manner as to come into good frictional contact with the inner surface of a metal ring 14. This ring may likewise be made of a metal having heat resistant qualities such for example as a suitable cast iron. The cylindrical ring 14 is held stationary with reference to the rotatable drum 10 which is adapted to turn, as shown, in a clockwise direction.

The drum 10 and the ring 14 constitute relatively rotatable heat exchange members. While in the illustrated embodiment I have shown the drum 10 as being rotatable and the ring 14 as being stationary, it will be evident, in keeping with the spirit of this invention, that the heat exchanger can be so designed that either of these members can be rotated and the other held stationary. In other words, all that is required is that the eccentric members 10 and 14 be relatively rotatable in heat transfer contact with each other.

The cylindrical ring member 14 has an outer integral metal shroud 15 which cooperates with the outer surface of the ring proper to define an annular fluid chamber 16 about ring 14 and concentric therewith. This annular chamber is divided into two arcuate halves by diametrically opposed projections 17—17 on and integral with ring 14.

In addition, the metal ring 14 has projecting radially from it into chamber 16 a plurality of fins 18 which are of slightly less depth than the depth of the annular chamber 16. These fins are for the purpose of augmenting heat transfer as is a common attribute of fins when used in heat exchangers.

The projections 17—17 not only serve to divide the annular chamber 16 into two halves but also separate air inlet and outlet ducts for the chamber. The upper projection 17 (Fig. 1) separates an air inlet or passage 19 from a hot gas outlet or passage 20. Similarly, the lower projection 17 separates an air outlet or passage 21 from a heated gas inlet or passage 22. It is clear that the inlet 19 and outlet 21 are connected to the upper and lower extremities of one-half of the chamber 16. Likewise, the outlet 20 and the inlet 22 are connected to the upper and lower extremities respectively of the other or right-hand half of chamber 16 (Fig. 1).

These inlets and outlets may be formed in any suitable way but are here illustrated as being integral with the metal shroud 15 which can be made of steel sheet or the like.

As shown in Fig. 1, the lower portion of the heat exchanger may be suitably connected to a base or support 23 if it is so desired. For illustration, the outlet 21 and the inlet 22 could be made as components of the base 23 within the spirit of this invention.

Referring to Fig. 2, it will be observed that the sides or ends of the heat exchanger may be suitably closed by metal plates 24 and 25 fastened in any suitable manner to the shroud 15.

Also referring to Fig. 2, it will be noted that the drum 10 has an internal gear 26, the teeth of which mesh with a driving gear 27 on a shaft 28 projecting through an aperture 29 in plate or side 25. Any suitable prime mover may be employed for actuating the drive shaft 28.

While numerous heat transfer arrangements are possible by the relatively rotatable members 10 and 14, I have illustrated one application which has been found to be highly advantageous. In the illustrated gas turbine application fluid or air to be heated enters the left-half of chamber 16 (Fig. 1) through inlet duct 19 and passes downwardly around the drum to the air outlet duct 21. Heated gas such as the exhaust from an engine of a turbine enters the right-half of chamber 16 from inlet 22 and travels upwardly around the drum to the gas outlet duct 20.

In the course of the travel of the hot gas through the right-half of chamber 16 heat is transferred to the particulated material 13 in the boxes 14 on drum 10. This is occasioned by the scrubbing of such material against the heated inner surface of ring 14. The transfer of heat to ring 14 is, of course, enhanced by the fins 18.

Contemporaneously, as the drum 10 rotates the heated sectionalized masses of material 13 are brought into contact with and scrub the internal surface of the left half of ring 14 imparting heat thereto.

The heat imparted to the left half wall or half of ring 14 is in turn transferred to the air traveling downwardly in the left half of chamber 16. The fins 18 likewise assist in the imparting of heat to the downwardly traveling air stream for preheating the same. This air for example may comprise compressed air discharged from a compressor on its way to a combustion chamber (not shown).

The foregoing heated chamber, while somewhat similar to a rotating regenerator, does not have any sealing problems or so-called "leak-down" losses.

It is believed that my novel method of heat transfer between two relatively movable members such as the members 10 and 14 will be fully understood from the foregoing description of one form of exchanger capable of practicing the method.

I claim as my invention:

1. In a heat exchanger, a main housing having pairs of inlets and outlets, an intermediate generally cylindrical housing having partitions dividing the main housing into separate fluid chambers each with an inlet and an outlet, an inner cylindrical housing nested within said intermediate housing, means effecting relative rotation between said intermediate and inner housings, radial partitions on said inner housing extending to close running relation with said intermediate housing, and compacted relatively movable solid flowable material carried by said inner housing between said radial partitions for scrubbing the surface of the intermediate housing during relative rotation between the intermediate and inner housings to effect heat transfer therebetween and between fluid in said separate fluid chambers.

2. In a heat exchanger, a main housing having pairs of inlets and outlets, an intermediate generally cylindrical housing having partitions dividing the main housing into separate fluid chambers each with an inlet and an outlet, fins mounted on said intermediate housing extending into said fluid chambers, means for delivering streams of fluid through said separate fluid chambers, an inner cylindrical housing nested within said intermediate housing, means effecting relative rotation between said intermediate and inner housings, radial partitions on said inner housing extending to close running relation with said intermediate housing, and compacted relatively movable solid flowable material carried by said inner housing between said radial partitions for scrubbing the surface of the intermediate housing during relative rotation between the intermediate and inner housings to effect heat transfer therebetween and between fluid in said separate fluid chambers.

References Cited in the file of this patent

UNITED STATES PATENTS

| | | |
|---|---|---|
| 695,041 | Fues | Mar. 11, 1902 |
| 2,535,351 | Crawford | Dec. 26, 1950 |
| 2,563,415 | Pennington | Aug. 7, 1951 |
| 2,615,685 | Bowden et al. | Oct. 28, 1952 |

FOREIGN PATENTS

| | | |
|---|---|---|
| 543,093 | Great Britain | Feb. 10, 1942 |